(12) United States Patent
Kubli et al.

(10) Patent No.: US 7,870,792 B2
(45) Date of Patent: Jan. 18, 2011

(54) FORMING LIMIT STRAIN ANALYSIS

(75) Inventors: Waldemar Kubli, Neerach (CH); Matthias Sester, Zurich (CH)

(73) Assignee: Autoform Engineering GmbH, Neerach (CH)

( * ) Notice: Subject to any disclaimer, the term of this patent is extended or adjusted under 35 U.S.C. 154(b) by 236 days.

(21) Appl. No.: 12/100,061

(22) Filed: Apr. 9, 2008

(65) Prior Publication Data
US 2009/0056468 A1 Mar. 5, 2009

(30) Foreign Application Priority Data
Apr. 12, 2007 (CH) .................................... 0603/07

(51) Int. Cl.
*G01N 3/08* (2006.01)
(52) U.S. Cl. ........................................ 73/826
(58) Field of Classification Search .................... 73/826
See application file for complete search history.

(56) References Cited

U.S. PATENT DOCUMENTS

| | | | | |
|---|---|---|---|---|
| 5,572,896 | A | * | 11/1996 | Story ........................... 72/350 |
| 5,905,204 | A | * | 5/1999 | DeGiorgi et al. ............... 73/826 |
| 6,731,996 | B1 | * | 5/2004 | MacEwen et al. ............. 700/97 |

OTHER PUBLICATIONS

H.Vegter, et al. International Journal of Plasticity: "A Plane Stress Yield Function for Anisotropic Sheet Material By Interpolation of Biaxial Stress States"; Bd. 22, NR.3, Mar. 1, 2006.

Stoughton, Thomas B.; "A general forming limit criterion for sheet metal forming"; International Journal of Mechanical Sciences; 42 (2000); pp. 1-27.
Yoshida, Kengo et al.; "Path-dependence of the forming limit stresses in a sheet metal"; International Journal of Plasticity, Pergamon; vol. 23, No. 3; Dec. 4, 2006; pp. 361-834; XP005793086.
Gronostajski, J. et al.; "The system for sheet metal forming design of complex parts"; Journal of Materials Processing Techonology; Elsevier, Amsterdam, Netherlands; 157-158; Dec. 20, 2004; pp. 502-507; XP004681749.
Butuc, M.C. et al.; "An experimental and theoretical analysis on the application of stress-based forming limit criterion"; International Journal of Mechanical Sciences, Pergamon Press, Oxford, Great Britain; vol. 48, No. 4; Apr. 2006; pp. 414-429; XP005268929.

* cited by examiner

*Primary Examiner*—Lisa M Caputo
*Assistant Examiner*—Octavia Davis
(74) *Attorney, Agent, or Firm*—Rankin, Hill & Clark LLP

(57) ABSTRACT

In the computed-based analysis of forming processes, for example, manufacturing sheet metal parts for the automobile industry, the material loading is represented by major and minor strains $\epsilon_I$, $\epsilon_{II}$ and is visualised with respect to a forming limit strain curve. In the method according to the invention, one proceeds from a target state (4n) of the material, as has been determined in the computed simulation of the forming process. A proportional trajectory of a loading and thus of the state variables of the material, in particular of the stresses ($\sigma$), is determined, which leads to the same target state. The associated proportional strain trajectory is evaluated for this proportional loading trajectory. The strain state (4p) which results from this strain trajectory, is called the equivalent strain state (4p) and may be used in the forming limit strain diagram for assessing the target state. Thereby, the equivalent strain state is set in relation to the forming limit strain curve (1) for the proportional trajectories.

12 Claims, 2 Drawing Sheets

FORMING LIMIT STRAIN ANALYSIS

BACKGROUND OF THE INVENTION

The invention relates to the field of numerical analysis of forming processes, as occur when machining sheet metal by way of forming technology. It particularly relates to a method for forming limit strain analysis, and to a corresponding computer program, to a data carrier, and to a data processing device, according to the preamble of the respective independent claims.

DESCRIPTION OF THE STATE OF THE ART

Forming parts, in particular sheet metal forming parts for the manufacture of automobiles for example, as a rule, are manufactured by way of deep-drawing. Semi-finished products, so-called sheet metal billets, are placed in multi-part forming tools for this purpose. The parts are formed by way of presses, in which the forming tools are clamped. As a rule, the parts are manufactured from a flat sheet metal billet via several forming stages, such as drawing, finish bottoming, adjustment, etc., combined with cutting steps.

CAD/CAE programs (computer aided design/computer aided engineering) are applied for the design of forming tools, thus for example punches, dies and sheet metal holders, as well as for the design of the forming processes, thus for example tool forces, drag bars, lubrication, shape and material for the sheet metal billets. These, by way of finite element models (FEM), simulate or model a forming process by way of simulation parameters. Simulation parameters on the one hand describe the geometry of the tools used in the forming process, and on the other hand the process parameters. The simulation computes the strains occurring in the material points of the FE-model, and other state variables of the material, in particular stresses, in the known manner and on the basis of material laws.

The stresses and strains in the material points are visually presented to the design engineer, for assessing the simulation results. Usually, only plane tensors of the stress and strain are considered in sheet metal forming technology. A main axis transformation is carried out for visualizing these tensors, and a plane strain tensor in this main axis system is represented by a larger major strain $\epsilon_I$ and a smaller minor strain $\epsilon_{II}$. This analogously applies to the stresses (major stress, minor stress). Generally, it is common to assess the position of a strain state described by the major and minor strains, in relation to the position of a forming limit strain curve. The forming limit strain in sheet metal is defined as the state in which a further deformation of the sheet metal leads to a failure of the material, in particular to necking and fractures.

At this point, it is important to clearly differentiate between proportional and non-proportional loadings. With a proportional loading, all loading parameters (e.g. the components of a strain tensor or stress tensor) are in a fixed relation to one another. With a non-proportional loading however, each loading parameter may follow its own time function. In the theory of plasticity, a stress-controlled proportional loading always results in a proportional strain path and vice versa, since it is the case of $d\epsilon_{ij}^P = d\lambda n_{ij}$ for the increase of plastic strain, with $n_{ij} = \partial f / \partial \sigma_{ij}$, wherein f is a scalar yield function, $\sigma_{ij}$ and $\epsilon_{ij}^P$ the components of the stress tensor or plastic strain tensor respectively, and $\lambda$ a proportionality constant.

Usually, forming limit strains are measured in bi-axial trials, with which the load component is increased in a proportional manner, until a necking occurs. Then, it is known that for certain combinations of major strains $\epsilon_I$ and $\epsilon_{II}$, a material failure occurs with a further increase of the strains. A curve according to such combinations is called a forming limit strain curve FLC in a forming limit strain diagram, and is shown by way of example in FIG. 1. Similar figures and further information with regard to the background of the invention are to be found in the article "A general forming limit criterion for sheet metal forming", by Thomas B Stoughton; International Journal of Mechanical Sciences; 42 (2000); pages 1-27.

The forming limit strain curve 1 is determined experimentally for a certain material and as the case may be, for sheet metal with a certain thickness. As is described in the mentioned article, amongst other things, it has been found that the forming limit strain curve 1 is only valid if a proportional strain path is present, which means that the ratio of $\epsilon_I$ and $\epsilon_{II}$ is constant at every point in time, during the trajectory 2 of the strain, from the unstrained state to a target state 4. The forming limit strain diagram is known and is popular for the analysis and visualisation of strain states and the reserves which are still present until the failure of the material. Designers are used to assessing the probability of failure of material points according to their position to the forming limit strain curve. In particular, one may conclude a failure or non-failure of the material, depending on the position of the strain state in the target state 4 to the forming limit strain curve 1.

However, non-proportional strain paths occur in real forming processes. This is the case if several forming operations occur in succession, and thus, a certain material section is firstly strained in one direction, and subsequently in another direction, wherein it may then also be upset again in the first direction. Such non-proportional strain paths may also occur in the course of a single forming operation. One exemplary non-proportional strain path 3 is drawn in FIG. 1. It leads to the same target state 4 as with the proportional path 2, but the forming limit strain curve 1 is no longer valid for assessing this target state 4, since the forming limit strain curve 1 is dependent on the strain path 2, 3. Different forming limit strain curves result, depending on the path, as is represented by way of example in FIG. 2. Thus a different forming limit strain curve 1n applies to the target state 4n, which is reached via a non-proportional loading path 3, and at the end has the same strain values $\epsilon_I$ and $\epsilon_{II}$ as the target state 4 in FIG. 1. The unchanged forming limit strain curve 1 for proportional strains is drawn in a dashed manner for comparison.

Evidently, the comparability and the intuitive assessment of strain states are lost in this manner. For this reason, it is suggested in the mentioned article by Stoughton, to carry out the analysis in stress space, as is shown in FIG. 3. Analogously to the strain space, the stresses are transformed onto a major axis system with the major stress $\sigma_I$ and with the minor stress $\sigma_{II}$. Likewise, a forming limit stress curve 5 is analogously introduced, so that the material failure is to be expected when a stress state 8 exceeds this curve. Experiments for the materials which are typically used for sheet metal forming, have found that the shape and the position of the forming limit stress curve 5 thereby is largely independent of the path via which a stress state to be assessed is reached, in particular of whether a proportional stress trajectory 6 or a non-proportional trajectory 7 is present.

In practice, there exists the problem that the failure assessment with such stress curves is not familiar to the users of respective simulation programs, and that the sensitivity of the stresses is very low in the region of the forming limit stress curve, i.e. also larger strain changes lead to only small stress changes as a result of the slight material hardening in the vicinity of the failure, so that even small uncertainties in the position of a stress state to be assessed, may make the difference between failure and non-failure. For these reasons, the forming limit stress curve in practice is hardly used for assessing the failure.

The article "Influence of forming change path on the forming limit changes of fine sheet metal", by Wolfgang Müschenborn and Hans-Martin Sonne, Arch. Eisenhüttenwes. 46, No. 9, September 1975, pages 597-602, describes how the forming limit strain curve (called forming limit change curve or "Grenzformänderungskurve" in this document) shifts, when a strain path (or forming change path, i.e. "Formänderungsweg") consists of two strain paths which in each case are proportional (Picture 9). Thus, from an experimentally determined limit strain state (with which therefore the material failure is ascertained), which occurs after such a two-part strain path, one may evaluate a corresponding point on the forming limit strain curve for a purely proportional loading. However, it is not evident how this evaluation is carried out, and how one should proceed in the case of more than two proportional strain path sections, or in the case of infinite strain paths. Moreover, the assessment of an infinite strain state with regard to the forming limit strain curve is not envisaged.

"Path-dependence of the forming limit stresses in sheet metal" by Kengo Yoshida, Toshihiko Kuwbara, Mitsutoshi Kuroda, International Journal of Plasticity, Pergamon, Vol. 23, No. 3, 2006-12-04, p. 361-384 describes the dependence of the forming limit stress curve on the strain path. The analysis uses refined material models and shows under which states a path dependency of the forming limit stress curve occurs (with "unstable pseudo-localisation"). However, no back-transformation for determining equivalent strains from the stresses is disclosed.

"The system for sheet metal forming design of complex parts" by J. Gronostajski, A Matuszak, A. Niechajowicz, Z. Zimniak, J. Materials Processing Technology, Elsevier, Amsterdam, Vol. 157-158, 2004-12-20, pp. 502-507, amongst other things, shows the application of the forming limit stress curve in a FEM-system. Thereby, one makes the assumption that the forming limit stress curve is independent of the strain path. However, no back-transformation for determining equivalent strains from stresses is disclosed.

"An experimental and theoretical analysis on the application of stress-based forming limit criterion" by M. C. Butuc, J. J. Gracio, A. Barata de Rocha, Int. J. Mechanical Sciences; Pergamon, Oxford, Vol. 48, No. 4, 2006-04, pp. 414-429 describes variant computations with different linear and complex strain paths, and their influence on the forming stress curve. The influence of different parameters is likewise taken into consideration. However, here too, no back-transformation for determining equivalent strains for stresses is disclosed.

BRIEF DESCRIPTION OF THE INVENTION

It is therefore the object of the invention to provide a method for the forming limit strain analysis of the initially mentioned type, which permits an improved analysis, assessment and visualisation of forming limit strain states, as well as a corresponding computer program, a data carrier and a data processing device.

A method for forming limit strain analysis, a computer program, a data carrier and a data processing device, with the features of the respective independent patent claims, achieve this object. Thereby, the forming limit strain analysis relates to forming processes on a sheet metal, which is formed in one or more forming steps.

Thus, in the method according to the invention, one proceeds from a target state of the material, as it was determined in the numerical simulation of the forming process. Thereby, the target state may have been achieved via a non-proportional trajectory of the stresses and strains. Now, a proportional trajectory of a loading and, thus, of the stresses is determined, which leads to the same target state in the stress space. The associated, proportional strain trajectory is evaluated for this proportional stress trajectory. The strain state which results from this proportional strain trajectory, is indicated as an equivalent strain state. This equivalent strain state may now be used in the forming limit strain diagram for assessing the target state! Thereby, the equivalent strain state is set in relation to the forming limit strain curve for proportional strains.

Thus, only a single forming limit strain curve is required, and all observed points (equivalent strain states) in the strain space may be assessed with respect to the same curve. Even with non-proportional trajectories, a uniform analysis and also a comparison of different states of the material may be effected by way of this. The representation is simplified and the technical information and interpretation ability is significantly improved.

Thus, equivalent strain states have been determined by way of the indirect route via the stress space, or another state space, in which the state points with respect to failure are independent of the path via which they have been reached, and these equivalent strain states in each case correspond to a proportional strain, which leads to the same stress state.

The term "target state" here relates to the target in the stress space, which is to be reached with the equivalent strain. In combination with the complete parts manufacturing process, this target state may correspond to an intermediate state or to an end state of the forming process.

The description above shows the basic principle of evaluating the equivalent strains by way of a given target state of the stresses. Various possibilities exist in practice for implementing this principle.

In a preferred embodiment of the invention, one simulates a proportional strain trajectory with a defined start value for the ratio of the strains. The stresses in the end state, after the strain trajectory, are computed from the simulation. These stresses are compared to the target state of the stresses. The ratio of the strains is iteratively adapted on account of the deviations, by way of an optimisation method, until the simulation at least approximately leads to the target state of the stresses, thus for example, until the deviation of the computed stresses falls short of the stresses in the target state by a certain amount. The proportional strains determined in this manner lead to the searched equivalent strain state.

In another preferred embodiment of the invention, a multitude of corresponding strain states and stress states for proportional trajectories are computed in a preparation phase, carried out as a one off. The mapping between stresses and strains is stored in tables or by approximation functions or a combination of tables and functions. This advance computation is effected in each case for a certain material, possibly in combination with further parameters such as the sheet metal thickness for example.

The term "material" on the one hand collectively indicates a certain alloy, and on the other hand a certain treatment of the material. In the repeated operation of the method, the equivalent strain state is read out from the tables or is computed by way of the approximation functions, in each case for a given target state of the stresses. If known, one may also use exact and/or analytically determinable functions instead of approximation functions. Thus, the proportional loading is described directly in the form of the equivalent strain, without a proportional trajectory of the stresses being explicitly computed.

In another preferred embodiment of the invention, with the practical implementation of the method, it is not necessarily the stresses which are directly used, but further state variables or state measures, which with regard to failure, are independent of the path via which they have been reached. A series of other state variables which have a direct relationship with the stresses, and may thus be used for the implementation of the method, such as a yield normal or an increment of the strains in the last computed time step of the simulation, are available with the usual finite element implementations for problems with finite plastic strains. One set of such state variables may preferably be mapped onto the stress states, and in particular vice versa, the stress states may be imaged onto such a set of state variables, thus by way of a bijective mapping. For this reason, the other sets of state variables may also be indicated as "stress-related state variables" or "stress-equivalent state variables" or "path-independent state variables".

Moreover, for reasons of numerical stability, for example, instead of the state variables which describe the actual stress state or stress-related state variables in a material point, one may apply a temporal or local averaging or filtering of these variables. The temporal filtering takes into account the last pair of state values before the target state, and the spatial filtering takes into account adjacent material points, for example, in a smoothing of the stress values in the material points.

In a further preferred embodiment of the invention, the equivalent strain state is computed from the target stress state by way of the material laws. Thereby, preferably the elastic share of the deformation is neglected in comparison to the plastic share, and the total strain is equated with the plastic strain, thus $\epsilon_{ij} = \epsilon_{ij}^p$. With metals, this creates only slight inaccuracies, and is justified as a good approximation within the framework of failure assessment in forming technology. Moreover, on account of the fact that a proportional strain trajectory is present, an integration of the plastic strain increments over a deformation path is replaced by a multiplication. Thus, on account of the assumption of a proportional strain path, one does not have to integrate along the deformation path via the plastic strain increments $d\epsilon_{ij}^p$.

Instead of this, one determines total plastic strains $\epsilon_{ij}^p$, which lead to the stresses in the target state. The total plastic strains $\epsilon_{ij}^p$ are coaxial to the yield normal $n_{ij}$ in the target state of the stresses, i.e. $\epsilon_{ij}^p = \lambda n_{ij}$. Thereby $\lambda$ corresponds to a plastic multiplier. $\lambda$ is preferably determined by way of the material laws from the stress state and strain state in the target state, for example, by way of the yield condition and/or the stress-strain curve and/or the plastic work principle. Preferably, the yield normal $n_{ij}$ is calculated back from the target stress state via the relationship $n_{ij} = \partial f / \partial \sigma_{ij}$. Alternatively, the equivalent strain path may also be computed from other state variables of the material, for example, directly from the current yield normals $n_{ij}$ in the target state. Further conceivable state variables, amongst other things, are the current plastic strain increment $d\epsilon_{ij}^p$ or a temporal average (e.g. floating average) of the plastic strain increment $d\epsilon_{ij}^p$, or other stress-related state variables, which are directly related to the target stress state.

Basically, different computation methods are possible, depending on which simplifications have been made. However, what is common is the concept of a proportional load being determined, which leads to a given target state of the material, and the strain state corresponding to this proportional load being used in the forming limit strain diagram.

The data processing system for forming limit strain analysis includes storage means with computer program code means stored therein, which describe a computer program, and data processing means for carrying out the computer program, for implementing the method according to the invention.

The computer program for the forming limit strain analysis according to the invention, may be loaded into an internal memory of a digital data processing unit, and includes computer program code means which, when implemented in a digital data processing unit, cause this to carry out the method according to the invention. In a preferred embodiment of the invention, a computer program product includes a data carrier, or a computer-readable medium, on which the computer program code means are stored.

Further preferred embodiment variants are to be deduced from the dependent patent claims.

BRIEF DESCRIPTION OF THE DRAWINGS

The invention is hereinafter described in more detail by way of preferred embodiments, which are represented in the accompanying drawings. In each case, there are schematically shown in.

The reference numerals used in the drawings and their significance are listed conclusively in the list of reference numerals. Basically, the same parts are provided with the same reference numerals in the figures.

DETAILED DESCRIPTION OF THE INVENTION

In each case, in a material point, a given material state with respect to its strains is represented by an equivalent strain state, wherein the equivalent strain state is produced by a proportional strain trajectory, which leads to the same stress state which the given material state has. The given material state is hereinafter called "target state", since the desired proportional strain trajectory is indeed to lead to this state.

Figure 3:
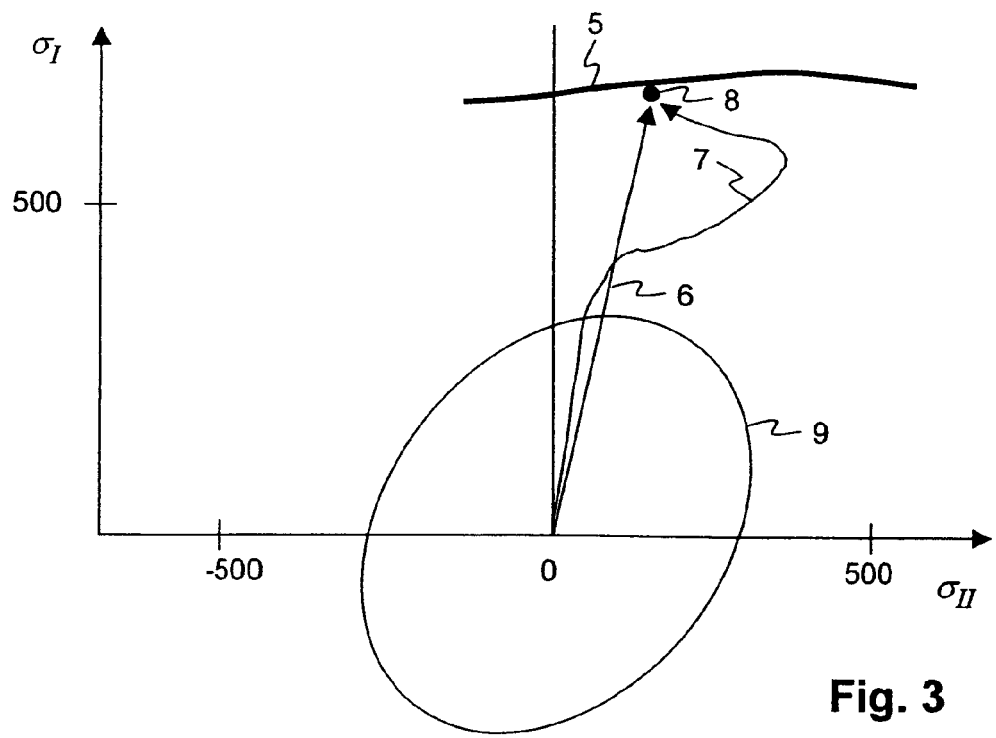
FIG. 3 a forming limit stress curve.
Figure 4:
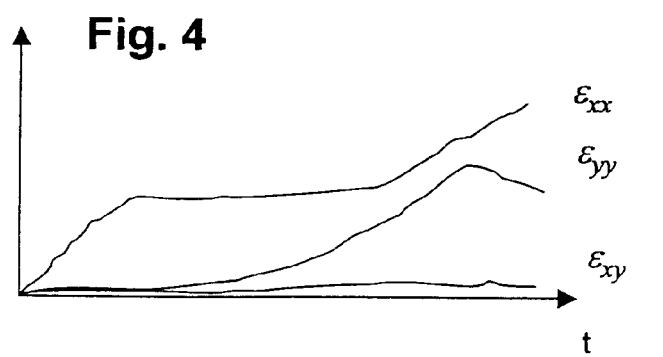
FIG. 4 values of a plane strain tensor in the course of a deformation.
Figure 5:
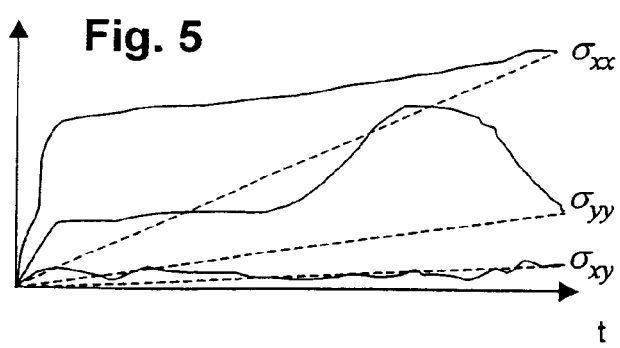
FIG. 5 values of a plane stress tensor in the course of a deformation.

The stresses in the target state are represented for example by way of a plane stress state or a plane stress tensor [$\sigma_{xx}$, $\sigma_{yy}$, $\sigma_{xy}$]. By way of a main axis transformation, the stress state [$\sigma_{xx}$, $\sigma_{yy}$, $\sigma_{xy}$] in the known manner is represented by a major stress and a minor stress $\sigma_I$, $\sigma_{II}$, and may be represented by a point 8 in the stress plane, as in FIG. 3. The stresses are determined by way of FEM-simulation of the forming operation to be examined. The generally known yield surface (or yield locus) 9 is also drawn in the stress plane. FIG. 5 shows exemplary temporal trajectories of the stress state. FIG. 4 shows the trajectories of the associated plane strain tensor which are likewise determined in the simulation. The irregular trajectories in the figures correspond to non-proportional deformation paths. Furthermore, dashed lines are drawn in the stress diagram, which correspond to a proportional stress trajectory, which means that at each point in time $$\frac{\sigma_{yy}}{\sigma_{xx}} = const \text{ and } \frac{\sigma_{xy}}{\sigma_{xx}} = const.$$

Figure 1:
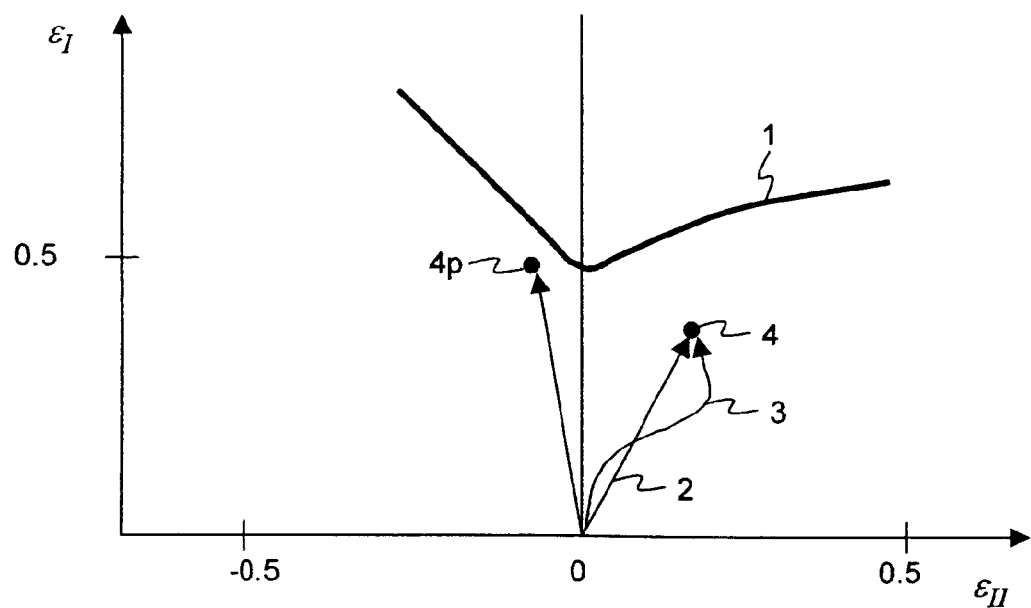
FIG. 1 a forming limit strain curve.
Figure 2:
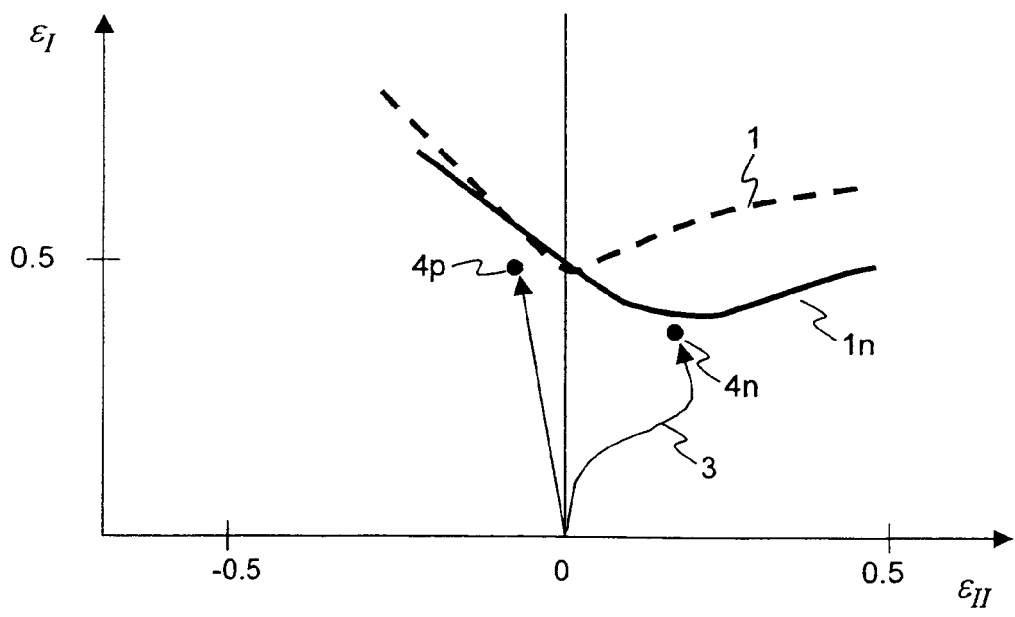
FIG. 2 forming limit strain curves with non-proportional strain trajectories.

By way of example, the equivalent strain state 4p from a proportional strain trajectory is drawn in FIG. 1, said strain state corresponding to the stress state 8 and the strain state 4n from a non-proportional strain of FIG. 2.

In a preferred variant of the invention, the evaluation of equivalent strains is based on repeated forward simulations with a proportional strain trajectory, which are iteratively repeated and optimised until the given stress state [$\sigma_{xx}$, $\sigma_{yy}$, $\sigma_{xy}$] is achieved. In further, preferred embodiments of the invention, the results of systematically implemented forward simulations are stored and used for a back-transformation (using interpolation, as the case may be) from the quantity of the stress states, onto the quantity of the underlying proportional strain trajectories which lead to these stress states.

In a further preferred embodiment of the invention, a numerical determination of the equivalent strain is effected in the following manner, proceeding from the stresses in the target state. The notation hereinafter uses the numerals 1 and 2 instead of the indices x and y, and one should take account of the fact that the plane stress tensors or strain tensors are symmetrical, i.e. $\sigma_{12} = \sigma_{21} = \sigma_{xy}$.

1. From the plane stress state [$\sigma_{12}$, $\sigma_{22}$, $\sigma_{12}$] in the target state, the yield normal, hereinafter indicated by n (with the components $n_{ij}$), is determined via the yield surface of the material.
2. With a proportional deformation trajectory, according to the yield condition, the following applies for the plastic strains $\epsilon_{ij}^P$ $$\epsilon_{ij}^P = \lambda n_{ij} \quad (1)$$

wherein $\lambda$ is a yet unknown scalar corresponding to the plastic multiplier. According to the plastic work principle, for the product of effective strain $\bar{\epsilon}$ and the effective stress $\bar{\sigma}$, the following applies:

$$\bar{\sigma}\bar{\epsilon} = \sigma_{ij}\epsilon_{ij}^P \quad (2)$$

wherein $\sigma_{ij}\epsilon_{ij}^P$ is the abbreviated representation of $\sigma_{11}\epsilon_{11}^P + \sigma_{22}\epsilon_{22}^P + \sigma_{12}\epsilon_{12}^P + \sigma_{21}\epsilon_{21}^P$, thus a function of the stresses $\sigma_{ij}$ in the target state, as have been determined in the simulation, and of the still unknown, total plastic strains $\epsilon_{ij}^P$.

3. Substitution of (1) in (2) and solving with regard to $\lambda$ results in $$\lambda = \frac{\bar{\sigma}\,\bar{\epsilon}}{\sigma_{ij}\,n_{ij}} \quad (3)$$

by means of which one may determine $\lambda$. Thereby, the effective stress $\bar{\sigma}$ may be determined in the known manner with the help of the yield surface description, from the stress state, or by the simulation. The effective strain $\bar{\epsilon}$ may be determined from the simulation which led to the target state. Alternatively, the effective strain may be computed from the state variables in the target state, e.g. the current effective stress $\bar{\sigma}$ and the hardening curve of the material. The term $\sigma_{ij}n_{ij}$ (written out, $\sigma_{11}n_{11} + \sigma_{22}n_{22} + \sigma_{12}n_{12} + \sigma_{21}n_{21}$) is determined by the given stresses in the target state and by the yield normal.

4. The plastic strains $\epsilon_{11}^P$, $\epsilon_{22}^P$, $\epsilon_{21}^P = \epsilon_{12}^P$, may be computed by way of (1) with the value of $\lambda$ and, in turn, the major and minor strains $\epsilon_I$, $\epsilon_{II}$ may be computed from these plastic strains by way of a main axis transformation.

This procedure neglects the elastic components of the deformation with respect to the plastic components. The resulting errors with typical materials such as steel lie significantly below one percent and may be neglected.

Figure 6:
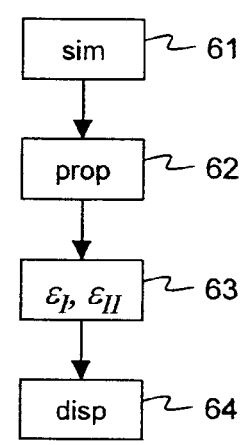
FIG. 6 a flow chart of one variant of the inventive method.

FIG. 6 shows a flow diagram of the procedure, with the steps:

computation of strains and stresses in the target state of a material point by way of the simulation 61;

computation of a proportional loading, which leads to the stresses in the target state 62;

determining an equivalent strain according to this proportional loading 63; and using this equivalent strain as a strain state in the target state of the material point 64, for example by way of visual representation in a forming limit strain diagram, together with the forming limit strain curve of the observed material.

The invention claimed is:

1. A method for forming limit strain analysis, wherein for at least one material point of a sheet metal which is formed by a forming process, proceeding from an initial state, a strain state in a target state of the material point is computed, and may be brought into relation with a forming limit strain curve, in a forming limit strain diagram, wherein the following steps are carried out:

simulating of the forming process and computing of strains $\epsilon$ resulting therewith, and further state variables of the material, in at least one material point of the sheet metal;

computing of further state variables of the material in the target state of the at least one material point;

computing of a proportional loading, which leads to a state corresponding to the further state variables of the material in this target state;

determining an equivalent strain corresponding to this proportional loading; and using this equivalent strain as a strain state in the target state of the material point.

2. The method according to claim 1, wherein the last step comprises:

visually representing the equivalent strain in a strain space, together with a forming limit strain curve, wherein the equivalent strain is preferably represented by major and minor strains $\epsilon_I$, $\epsilon_{II}$.

3. The method according to claim 1, wherein the further state variables in the target state are independent of the path, via which they have been reached.

4. The method according to claim 1, wherein the further state variables are the stresses in the at least one material point.

5. The method according to claim 1, wherein the steps for determining the proportional loading and the equivalent strain lie in carrying out the following steps for a material point:

specifying a strain ($\epsilon_{11}$, $\epsilon_{22}$, $\epsilon_{12} = \epsilon_{21}$);

simulating of a proportional strain trajectory according to this strain setting, thereby also computing the further state variables of the material;

comparing of the values of these computed, further state variables of the material with the values of the further state variables of the material in the target state, as well as repeated, iterative adapting of the specified strain and carrying out the simulation by way of an optimisation method, for the approximation of the values of the computed, further state variables of the material to the values of the further state variables of the material in the target state;

after completion of the optimisation method, determining the equivalent strain as the last used specified strain.

6. The method according to claim 1, wherein the steps for determining the proportional loading and the equivalent strain comprise carrying out the following step:

determining the equivalent strain by way of reading from a table and/or by way of evaluating functions, in accordance with the further state variables of the material in the target state.

7. The method according to claim 1, wherein the steps for determining the proportional loading and the equivalent strain comprise carrying out the following steps for a material point:

determining the stress state ($[\sigma_{11}, \sigma_{22}, \sigma_{12}]$) or further state variables ($[n_{11}, n_{22}, n_{12},]$) in the target state;

determining equivalent plastic strains $\epsilon_{ij}^p$ by way of a computer-based representation of the yield surface of the material by choosing the direction of the equivalent plastic strains $\epsilon_{ij}^p$ to be coaxial to the normal vector $n_{ij}$ of the yield surface in the target state, and by choosing length equivalent plastic strains $\epsilon_{ij}^p$ to be $\epsilon_{ij}^p = \lambda n_{ij}$, corresponding to a plastic multiplier $\lambda$ of the material, which leads to the target state;

equating the equivalent plastic strain with the total strain $\epsilon_{ij}$.

8. The method according to claim 7, further comprising the step of determining the plastic multiplier $\lambda$, by way of the material laws, from the target state, and in particular from the stress state and strain state in the target state.

9. The method according to claim 8, wherein the following steps are carried out for determining $\lambda$:

determining the effective stress $\bar{\sigma}$ in the target state determining the effective strain $\bar{\epsilon}$ in the target state;

determining $\lambda$ as $$\lambda = \frac{\bar{\sigma}\ \bar{\epsilon}}{\sigma_{ij}\ n_{ij}}.$$

10. A data processing system for forming limit strain analysis, wherein the data processing system comprises means for carrying out the method according to claim 1.

11. A computer program for forming limit strain analysis, which may be loaded and carried out on a data processing unit, and which, when implemented, carries out the method according to claim 1.

12. A data carrier containing a computer program according to claim 11.

* * * * *